UNITED STATES PATENT OFFICE.

ROBERT HOLLIDAY, OF HUDDERSFIELD, ENGLAND.

PROCESS OF PRODUCING AZO COLORS ON COTTON OR OTHER VEGETABLE FIBER.

SPECIFICATION forming part of Letters Patent No. 439,953, dated November 4, 1890.

Application filed January 2, 1890. Serial No. 335,674. (No specimens.)

*To all whom it may concern:*

Be it known that I, ROBERT HOLLIDAY, of Huddersfield, in the county of York, England, have invented certain new and useful Improvements in the Method of Producing Azo Colors on Cotton or other Vegetable Fiber, of which the following is a full, clear, and exact description.

The improvements relate to the processes described in United States Letters Patent granted May 17, 1881, No. 241,661; January 17, 1882, No. 252,317; March 17, 1882, No. 254,550, and February 6, 1883, No. 271,636; and they consist in combining in one operation one oiling of the fiber and the impregnation of the fiber with a phenolic body and as much fixed alkali as will develop the color, when the fiber is afterward passed into or impregnated with a solution of a diazo, diazo-azo, or tetra-azo compound, and this is carried into effect by mixing the oil—such as is usually employed in dyeing—with alizarine, with the phenol, and with or without a fixed alkali, reducing the mixture with water, according to the quantity of phenol required to be fixed, and after impregnating the fiber with this mixture drying it, when it will be ready to be impregnated by the solution diazo, diazo-azo, or tetra-azo compounds, such compounds being those which are known to produce coloring-matters separately from the fiber when combined with the phenol employed, those compounds which produce colors the least soluble in water being the most useful. Cotton or vegetable fiber can be treated in a raw state or partially or wholly manufactured.

As an example of the method of carrying this invention into effect, operating with beta-naphthol and the diazo compound derived from xylidine, I take, say, twenty pounds of beta-naphthol, one hundred pounds of sulphonated castor-oil not combined with alkali, twenty-five pounds of caustic soda 30° Baumé, and fifty-five pounds of water, and warm them together till the naphthol is dissolved; add twenty pounds of this mixture to one hundred pounds water; pass, say, one hundred pounds cotton, yarn, or other cloth through it; squeeze out well and dry it. The liquor left can be employed for more cotton. I prepare a bath of three pounds xylidine, nine pounds muriatic acid 20° Baumé, and eighteen hundred pounds water; keep cold, and add to it gradually—stirring all the time—a solution of two pounds nitrite soda in two hundred pounds cold water. After a few minutes I add powdered chalk to neutralize excess of acid, run off the clear into the dye-vat, and pass through it the cotton that has been prepared as above, and the color will be developed. It can be then washed, soaped, and finished in the usual manner.

The proportions given can be much varied and still give a beneficial result.

What I claim, and desire to be secured to me by Letters Patent, is—

1. As an improvement in the method of producing azo colors on vegetable fiber, subjecting the fiber to a mixture composed of oil, a phenolic body, and an alkali, and drying the fiber thus treated preparatory to subjecting it to the azo compound, substantially as described.

2. As an improvement in the method of producing azo colors on vegetable fiber, subjecting the fiber to a mixture composed of oil, a phenolic body, and an alkali, drying the fiber thus treated, and finally subjecting the dried fiber to an azo compound, substantially as described.

In witness whereof I have hereunto signed my name in the presence of two subscribing witnesses.

ROBERT HOLLIDAY.

DAVID J. BAILEY,
*Acting Consul Agent of the United States of America at Huddersfield.*
THOMAS H. BARRON,
*Market Place, Huddersfield.*